United States Patent
Belote et al.

(10) Patent No.: US 10,470,040 B2
(45) Date of Patent: *Nov. 5, 2019

(54) SECURE SINGLE SIGN-ON TO SOFTWARE APPLICATIONS

(71) Applicant: Okta, Inc., San Francisco, CA (US)

(72) Inventors: Thomas M. Belote, San Francisco, CA (US); Hassen Karaa, San Francisco, CA (US); Christine Wang, Saratoga, CA (US); Vinoth Jayaraman, Dublin, CA (US); Marc Powell, San Francisco, CA (US); Shaolin Shen, San Francisco, CA (US); Naveed Makhani, San Francisco, CA (US); Ankit Garg, San Francisco, CA (US)

(73) Assignee: OKTA, INC., San Francisco, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/687,528

(22) Filed: Aug. 27, 2017

(65) Prior Publication Data
US 2019/0069168 A1 Feb. 28, 2019

(51) Int. Cl.
*H04W 12/06* (2009.01)
*H04L 29/06* (2006.01)
*G06F 21/31* (2013.01)

(52) U.S. Cl.
CPC ............ *H04W 12/06* (2013.01); *G06F 21/31* (2013.01); *H04L 29/06782* (2013.01); *H04L 63/0815* (2013.01)

(58) Field of Classification Search
CPC ............... H04W 12/06; H04L 63/0815; H04L 29/06782; H04L 29/06; G06F 21/31
(Continued)

(56) References Cited

U.S. PATENT DOCUMENTS

| 5,937,066 A | 8/1999 | Gennaro et al. |
| 6,041,357 A | 3/2000 | Kunzelman et al. |

(Continued)

FOREIGN PATENT DOCUMENTS

WO   WO 2011/023456   3/2011

OTHER PUBLICATIONS

PCT International Search Report and Written Opinion for PCT/US2015/029093, dated Aug. 21, 2015, 12 Pages.
(Continued)

*Primary Examiner* — Kevin Bechtel
*Assistant Examiner* — Quazi Farooqui
(74) *Attorney, Agent, or Firm* — Fenwick & West LLP

(57) ABSTRACT

After an initial user sign-on with an identity provider, and in response to an intention of the user to use a third-party application executing on a client device of the user and requiring user sign-on, the identity provider provides a client script to the third-party application. The client script facilitates user and application authentication and invokes a trusted broker application that interacts with the identity provider to enable the user to use the third-party application. The use of the trusted broker application provided by the identity provider frees the authors of third-party applications from the need to modify their applications to explicitly sign in with the identify provider. For enhanced security, conformance to an organizational security policy is verified at time of sign-on, and an authenticatable link is used to invoke the third-party application to foil attempts by malicious software to substitute another application.

12 Claims, 3 Drawing Sheets

(58) Field of Classification Search
USPC .................. 726/17, 2; 713/155, 159, 161
See application file for complete search history.

(56) References Cited

U.S. PATENT DOCUMENTS

| | | | |
|---|---|---|---|
| 6,212,635 B1 | 4/2001 | Reardon | |
| 6,493,760 B1 | 12/2002 | Pendlebury et al. | |
| 6,988,657 B1 | 1/2006 | Singer et al. | |
| 8,776,209 B1 | 7/2014 | Kumar et al. | |
| 9,112,854 B1 | 8/2015 | Bhimanaik | |
| 9,319,469 B2 | 4/2016 | Ruhlen et al. | |
| 9,338,007 B1 | 5/2016 | Doshi | |
| 9,391,782 B1 | 7/2016 | Mironenko | |
| 2003/0005300 A1 | 1/2003 | Noble et al. | |
| 2003/0056096 A1 | 3/2003 | Albert et al. | |
| 2003/0182551 A1* | 9/2003 | Frantz .................. | G06F 21/41 713/170 |
| 2005/0044423 A1 | 2/2005 | Mellmer et al. | |
| 2005/0123142 A1 | 6/2005 | Freeman et al. | |
| 2006/0206709 A1 | 9/2006 | Labrou et al. | |
| 2007/0019616 A1 | 1/2007 | Rantapuska et al. | |
| 2007/0033148 A1 | 2/2007 | Cahill | |
| 2007/0234408 A1 | 10/2007 | Burch et al. | |
| 2008/0108333 A1 | 5/2008 | Jemison et al. | |
| 2009/0205032 A1 | 8/2009 | Hinton et al. | |
| 2010/0049790 A1 | 2/2010 | Schreiber | |
| 2010/0064134 A1 | 3/2010 | Gross et al. | |
| 2010/0251084 A1 | 9/2010 | Yoshida | |
| 2011/0010762 A1 | 1/2011 | Nijdam et al. | |
| 2011/0197077 A1 | 8/2011 | Chan et al. | |
| 2011/0231919 A1 | 9/2011 | Vangpat et al. | |
| 2011/0239283 A1 | 9/2011 | Chern | |
| 2012/0023556 A1 | 1/2012 | Schultz et al. | |
| 2012/0066752 A1 | 3/2012 | Vysogorets et al. | |
| 2012/0066756 A1 | 3/2012 | Vysogorets et al. | |
| 2012/0096277 A1 | 4/2012 | Perez Soria | |
| 2012/0216244 A1 | 8/2012 | Kumar et al. | |
| 2012/0254957 A1 | 10/2012 | Fork et al. | |
| 2012/0254959 A1 | 10/2012 | Schmidt et al. | |
| 2013/0080785 A1 | 3/2013 | Ruhlen et al. | |
| 2013/0086210 A1 | 4/2013 | Yiu et al. | |
| 2013/0086669 A1* | 4/2013 | Sondhi .................. | G06F 21/41 726/8 |
| 2013/0086670 A1 | 4/2013 | Vangpat et al. | |
| 2013/0125226 A1 | 5/2013 | Shah et al. | |
| 2013/0145172 A1 | 6/2013 | Shablygin et al. | |
| 2013/0145173 A1 | 6/2013 | Shablygin et al. | |
| 2013/0145445 A1 | 6/2013 | Lee | |
| 2013/0167209 A1 | 6/2013 | McBride et al. | |
| 2014/0019757 A1 | 1/2014 | Mehtala et al. | |
| 2014/0058945 A1 | 2/2014 | Stecher | |
| 2014/0059658 A1 | 2/2014 | Stecher | |
| 2014/0082715 A1 | 3/2014 | Grajek et al. | |
| 2014/0089658 A1 | 3/2014 | Raghuram et al. | |
| 2014/0109177 A1 | 4/2014 | Barton et al. | |
| 2014/0181518 A1 | 6/2014 | Kim et al. | |
| 2014/0282817 A1 | 9/2014 | Singer et al. | |
| 2014/0282821 A1 | 9/2014 | Adler et al. | |
| 2014/0310792 A1 | 10/2014 | Hyland et al. | |
| 2015/0113618 A1 | 4/2015 | Sinha et al. | |
| 2015/0163206 A1 | 6/2015 | McCarthy et al. | |
| 2015/0249645 A1 | 9/2015 | Sobel et al. | |
| 2016/0056962 A1 | 2/2016 | Mehtala | |

OTHER PUBLICATIONS

First Examination Report for New Zealand Patent Application No. NZ 727109, dated Jun. 30, 2017, 4 Pages.
Extended European Search Report for European Patent Application No. EP 15789376.9, dated Mar. 30, 2017, 6 Pages.
Examination Report No. 1 for Australian Patent Application No. AU 2015256293, dated Dec. 12, 2016, 2 Pages.

* cited by examiner

SECURE SINGLE SIGN-ON TO SOFTWARE APPLICATIONS

FIELD OF ART

The present invention generally relates to the field of software applications, and more specifically, to securely facilitating sign-on to multiple applications.

BACKGROUND

Many organizations, such as businesses or other enterprises, provide their employees or other members with access to a variety of software applications, such as e-mail applications, chat applications, payroll applications, time-keeping applications, and the like. For security reasons, the organizations may impose sign-in as a prerequisite for use of the applications. Thus, a user could potentially have a different set of sign-in credentials (e.g., username and password) for every application to which he or she has access. The necessity of separately signing in to each application (i.e., providing the user's credentials for that application) imposes considerable burden on users, who must enter the credentials for every application used, and on the organization's information technology departments, which must respond to user inquiries about forgotten credentials.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
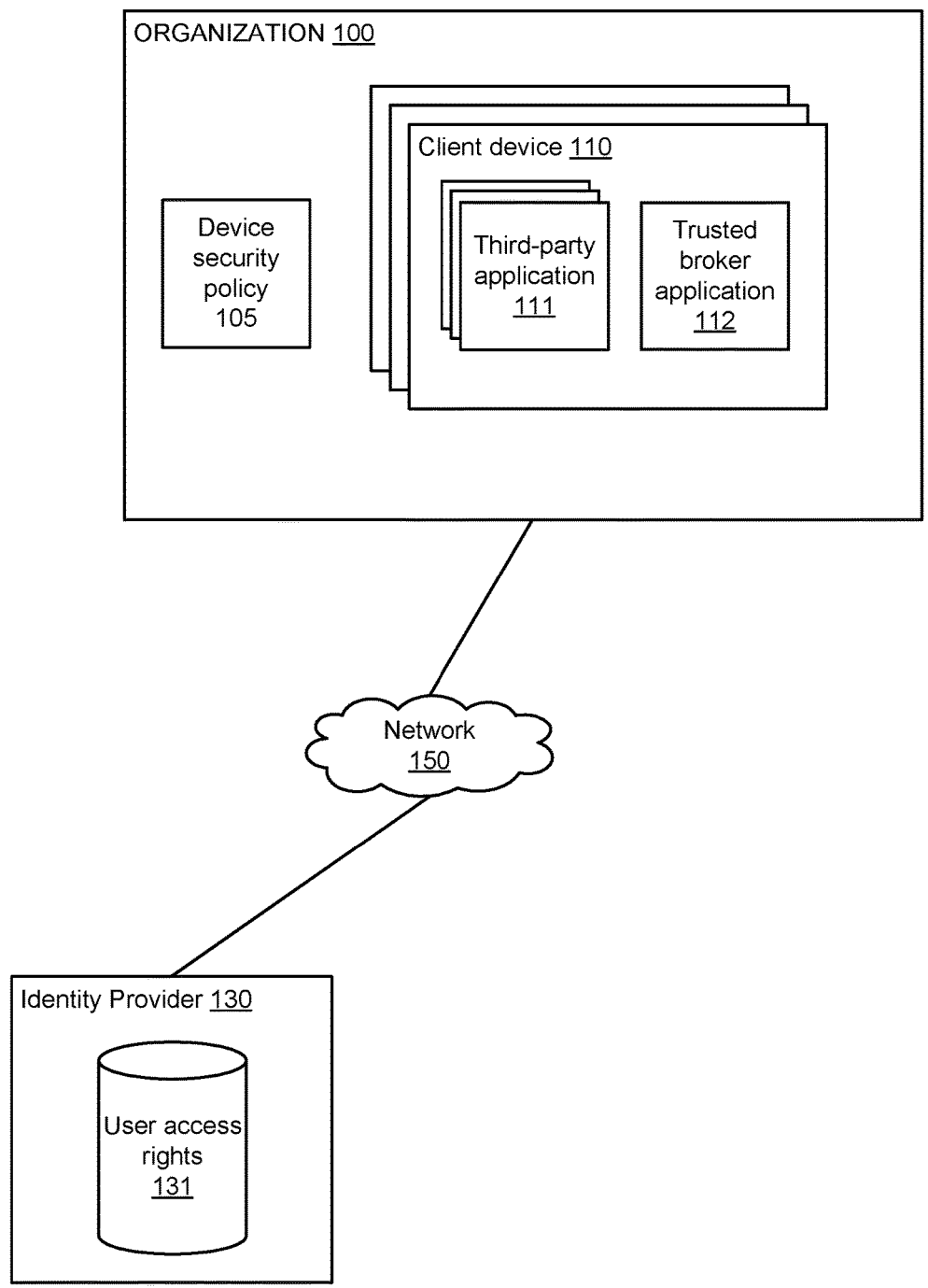
FIG. 1 illustrates a computing environment in which users of an organization sign into and use different software applications, according to one embodiment.

FIG. 1 illustrates a computing environment in which users of an organization sign into and use different software applications, according to one embodiment. An organization 100 has a number of client devices 110 used by different users (e.g., employees) of the organization. The client devices 110 provide a number of third-party applications 111, which for reasons of organizational security require user authentication before a user can use the applications. An identity provider 130 is responsible for user authentication with the applications 111 within the organization 100. A trusted broker application 112 on the client devices 110 acts as an intermediary between the identity provider 130 and the applications 111 also on the client devices, shielding the applications from the need for specific details about the identity provider 130 or the organization 100. These various components are now described in additional detail.

The organization 100 is an entity, such as a corporation, a school, a governmental department, or the like. Physically, the organization 100 is made up of a number of computing systems, including the client devices 110; one or more internal networks that connects the computing systems, including routers or other networking devices that define the boundary between the organization and external networks; and the like.

The organization 100 has one or more device security policies 105 that specify conditions that client devices 110 must satisfy in order to be permitted to log in to the applications 111, such as that the client device 110 uses a particular encryption scheme for encrypting communications, that the client device has a particular security application installed, or the like. In some embodiments, the device security policies 105 are embodied in digital certificates associated with the organization 100. When a client device 110 is enrolled by the organization 100 so that it is permitted to access resources of the organization, the device security policy 105 is stored on the client device so that it may later be verified that the device is conforming to that security policy.

The identity provider 130 manages user access to applications, services, and other resources for which user authentication is required. The identity provider 130 may be located at a location external to the organization 100, e.g., connected to the organization via network 150, as illustrated in FIG. 1. Alternatively, the identity provider 130 may be located within the boundaries of the organization 100 and administered by the organization itself.

The identity provider 130 comprises a user access rights database 131, which stores (e.g., in encrypted form) the user credentials used to authenticate a user to the identity provider itself. The user access rights database 131 may additionally contain other information, such as a list of the applications 111 to which the various users have access on the organization 100, the particular functionality available to the users within those applications, and the like.

The client devices 110 are computing devices such as smart phones, laptop computers, desktop computers, or any other device that can execute third-party applications 111.

A third-party application 111 is a software application usable via the client device 110, such as an enterprise e-mail application, an application or plug-in for accessing an enterprise file system, an enterprise database, or the like. The application 111 is termed a "third-party" application in that it may (though need not necessarily) be authored by an author other than the organization 100. In one embodiment, the third-party application's user interface is implemented in HTML or other web-based technology and is rendered within an embedded browser of the client device 110.

The third-party application 111 is aware of the existence of the identity provider 130 and has the ability to direct a client device of a user to the identity provider for authentication. (For example, an administrator of the organization 100 can specify the identity and network information of the identity provider 130 in configuration files accessed by the third-party application 111.) However, the third-party application 111 lacks the credentials of the user and the ability to access the saved credentials, nor does the third-party application innately have the ability to follow the protocols used to communicate with the identity provider 130 and with the trusted broker application 112. These capabilities are in effect added to the third-party application via a client script provided by the identity provider 130, as is described later with respect to FIG. 2.

The trusted broker application 112 is an application installed on each client device 110 of the organization 100 for which single sign-on is provided. The trusted broker application 112 may be created by the same author as the identity provider 130 and serves as an intermediary between the identity provider 130 and the third-party applications (which do not have the specifics of the particular identity provider).

The network 150 may be any suitable communications network for data transmission. In an embodiment such as that illustrated in FIG. 1, in which the identity provider 130 is located outside of the organization 100, the network 150 uses standard communications technologies and/or protocols and can include the Internet. In another embodiment, the entities use custom and/or dedicated data communications technologies.

Figure 2:
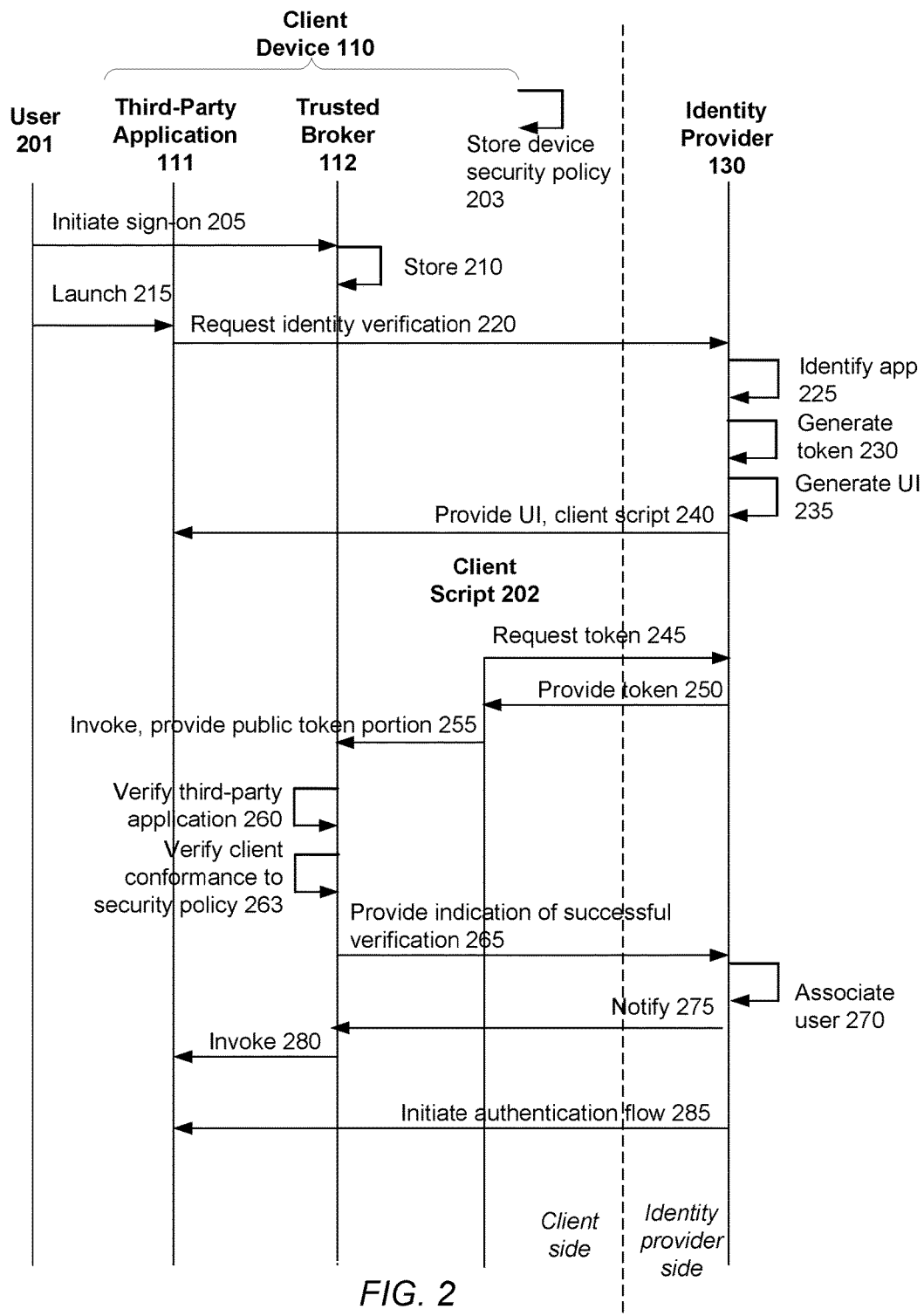
FIG. 2 illustrates the interactions that take place between different entities of FIG. 1 when verifying the identity of a user as part of single sign-on to applications, according to one embodiment.

FIG. 2 illustrates the interactions that take place between different entities of FIG. 1 when verifying the identity of a user as part of single sign-on to applications, according to an embodiment in which the client devices 110 are smartphones, and the applications 111 are native applications executing on the smartphones. Native smartphone applications typically lack full support for cookies, which could otherwise be used to aid the authentication process. Specifically, a user 201 of a client device 110 wishes to obtain access to one or more third-party applications 111 on the client device, where the access requires user authentication, and the user wishes to avoid re-entering authentication information for every separate application. Accordingly, to support single sign-on, and to avoid third-party applications being obliged to conform to details of the identity provider 130, the identity provider provides a client script to the trusted broker application 112, and the client script handles the details of communication with the identity provider. Among the communication details are generation and use of a token with public and private portions, which are used to confirm the user identity.

Accordingly, the user 201 initiates 205 a sign-on process that identifies the user to the identity provider 130, after which the identity provider 130 transparently handles authentication of that user with each separate third-party application 111 that the user uses. In a step 203, at time of enrollment of the client device 110 for use with the organization 100, the client device stores 202 the device security policy provided by the organization for that device, e.g., in the form of a security certificate.

In one embodiment, the initiation 205 of the sign-on process involves the user 201 launching the trusted broker application 112 and entering the user's credentials for the identity provider 130 (e.g., a username and password). Based on the entered user credentials, the trusted broker application 112 stores 210 information that will allow it to communicate with the identity provider 130 in the future. The information can be, for example, either the user's credentials themselves or information obtained based on the user's credentials. As an example of the latter, in some embodiments the identity provider 130 provides the trusted broker application 112 with a token that remains valid for some period of time (e.g., two hours). The trusted broker application 112 provides the stored information (e.g., the token) to the identity provider 130 as a means of authenticating itself whenever it communicates with the identity provider 130.

The user 201 then launches 215 the third-party application 111, and code of the third-party application requests 220 the identity provider 130 to verify the user identity. In one embodiment, the identity provider 130 identifies 225 the third-party application 111 in order to ensure that the application 111 is one for which the organization 100 has authorized single sign-on. The identity provider 130 can identify 225 the third-party application 111 by, for example, reading an application identity string or other identifier included by the third-party application 111 within an HTTP message embodying the identity verification request.

In some embodiments, the identity provider 130 further generates 230 a token that is later used to establish the identity of the user. The token has a public portion and a corresponding private portion, the public and private portions having been generated together, such that one portion may be matched against the other portion. For example, the public and private portions may respectively be public and private keys of a key pair of a public key cryptosystem.

The identity provider 130 can also optionally generate 235 a user interface (e.g., specified in HTML) that informs the user of the status of the actions taking place, such as noting that the trusted broker application 112 was detected and that the user is in the process of being automatically signed on.

Included within code for the user interface is a client script 202. The client script 202 is code that is responsible for implementing, on behalf of the third-party application 111, operations of an authentication protocol used by the identity provider 130. For example, in one embodiment the authentication protocol is OAuth, and the client script 202 is embodied in code of a client-side scripting language such as JavaScript. In one embodiment, the same client script 202 is provided to each third-party application 111 for which single sign-in functionality is desired. In one embodiment, the client script 202 also performs a number of operations, such as determining whether to show a traditional login interface or a single-sign on interface.

The identity provider 130 then provides 240 the generated user interface code and client script 202 to the third-party application 111 executing on the client device 110.

The client script 202 executes automatically after it is received by the third-party application 111 of the client device 110, running within the script runtime engine of the embedded browser in which the application 111 executes. In some embodiments, the client script 202 requests 245 the token generated by the identity provider 130, which the identity provider in turn provides 250. The public portion of the token is used later to establish the identity of the user whose identity is being verified.

The client script 202 also invokes 255 the trusted broker application 112, providing it the received public portion of the token. In one embodiment, the client script 202 accomplishes the invocation using an authenticatable link. An authenticatable link is a uniform resource locator (URL) having a network domain portion that is interpreted by the operating system of the client device 110 by querying a service running in that network domain to determine which application corresponds to that domain, and then executing that application Examples of authenticable links are Universal Links (used in the IOS™ operating system) and App Links (used in the ANDROID™ operating system). For example, if the trusted broker were provided by a company named XYZ, the application URL might be as follows:

https://trustedbroker.xyz.com/?pub=f802jf22ac8921af38cd90ae72c92fa3 where "trustedbroker.xyz.com" informs the operating system that it should query a service in the trustedbroker.xyz.com domain to determine which application should be invoked. The parameter "pub=f802jf22ac8921af38cd90ae72c92fa3" indicates the value of the public portion of the token.

The use of authenticable links addresses the danger inherent in other link systems, in which a malicious application can alter the operating system's mapping between the application URL's domain (e.g., trustedbroker.xyz.com) and the application that corresponds to that domain (e.g., the trusted broker application 112), such as a malicious application registering itself to correspond to the domain trustedbroker.xyz.com. The use of authenticable links, in contrast, ensures that the application that is invoked for the authenticable link is the application specified by the domain indicated in the link.

The trusted broker application 112 verifies 260 that single sign-on for the third-party application 111 is appropriate. For example, the trusted broker application 112 identifies the third-party application 111 (e.g., based on identifiers of the third-party application provided by the identity provider 130) and verifies that the application 111 is trusted and that the user 201 has permission to use it. (Unlike the identity provider 130, the trusted broker application 112 is aware of the identity of the user 201 due to the sign-on at step 205, and hence has the ability to verify user-specific requirements.)

The trusted broker application 112 verifies 263 that the client device 110 conforms to the device security policy of the organization 110. That is, the trusted broker application 112 accesses the device security policy (e.g., embodied as a certificate) obtained in step 203 during enrollment of the client device 110 and ensures that the client device fulfills each of the requirements (e.g., uses a certain type of encryption for communications) at the present moment. Verifying conformance to security policies at time of single sign-on addresses the danger that client device 110 conformance was last verified at an earlier time period and that the client device 110 has been altered to no longer be in conformance. (Such changes would be a risk with a system that checked device conformance only at predefined intervals, such as every several minutes.)

Assuming that the verification of step 260 is successful, the trusted broker application 112 provides 265 back to the identity provider 130 an indication that the verifications 260, 263 were successful, in some embodiments along with the public token portion. The identity provider 130 attempts to match the public portion of the token against the stored private portion. If the portions match, the identity provider determines that the message from the trusted broker application 112 is genuine, rather than spoofed, and accordingly determines that the user 201 was in fact authorized to use single sign-on for the third-party application 111. Since the trusted broker application 112 verified that the user 201 was authorized, it is appropriate at this point to allow sign-on requests for the user 201. Accordingly, the identity provider 130 associates 270 the user 201 with the third-party application 111 and with the public portion of the token and notifies 275 the trusted broker application 112 that the association is complete by sending a message over the network 150. The trusted broker application 112 in turn invokes 280 the third-party application 111. The invocation may be accomplished using a second application URL, such as the URL:

tpa://<parameters> which causes the operating system to invoke the application named "tpa", for example, or the authenticatable link app.tpa.com, which causes the operating system to query a service in the domain app.tpa.com to determine the correct application to invoke. "<parameters>" represents any parameters to be included, such as an identifier of a user to be signed on to the application 111 (e.g., "jsmith122"), or a command to run in the application (e.g., "open").

In another embodiment, the identity provider 130 does not explicitly notify 275 the trusted broker application 112 that the association of the user 201 with the third-party application 111 is complete. Rather, the trusted broker application 112 instead periodically polls the identity provider 130, passing it the private token portion to identify the user and third-party application in question.

With the identity of the user 201 verified, the identity provider 130 initiates 285 the actual authentication flow for the third-party application, which proceeds according to the authentication protocol used by the identity provider 130 (e.g., OAuth) and may use data interchange formats such as Security Assertion Markup Language (SAML). As part of the initiation, the identity provider 130 includes an indication of the verification of the user's identity and permission to use single sign-on for the third-party application 111. For example, the identity provider 130 can provide the third-party application with an OAuth token (distinct from the token generated at step 230) that establishes the rights of the requesting user 201 to use the third-party application 111. With authentication of the user 201 having successfully completed, the third-party application 111 then executes.

If the user 201 wishes to use other third-party applications 111, the operations proceed as in steps 215-280. That is, after the initiation 205 of sign-on and the storing 210 of user credentials, the steps 215-280 can be separately repeated for each distinct application 111 that the user 201 uses, without the need to repeat steps 205 and 210 (unless the security policy of the particular third-party application 111 requires a more recent occurrence of steps 205 and 210).

It is appreciated that although FIG. 2 illustrates a number of interactions according to one embodiment, the precise interactions and/or order of interactions may vary in different embodiments. For example, in another embodiment the launching 215 is instead accomplished by the trusted broker 112 receiving a designation of the third-party application 111 from the user, and accordingly invoking that application 111 (e.g., using an application URL such as those described above).

Figure 3:
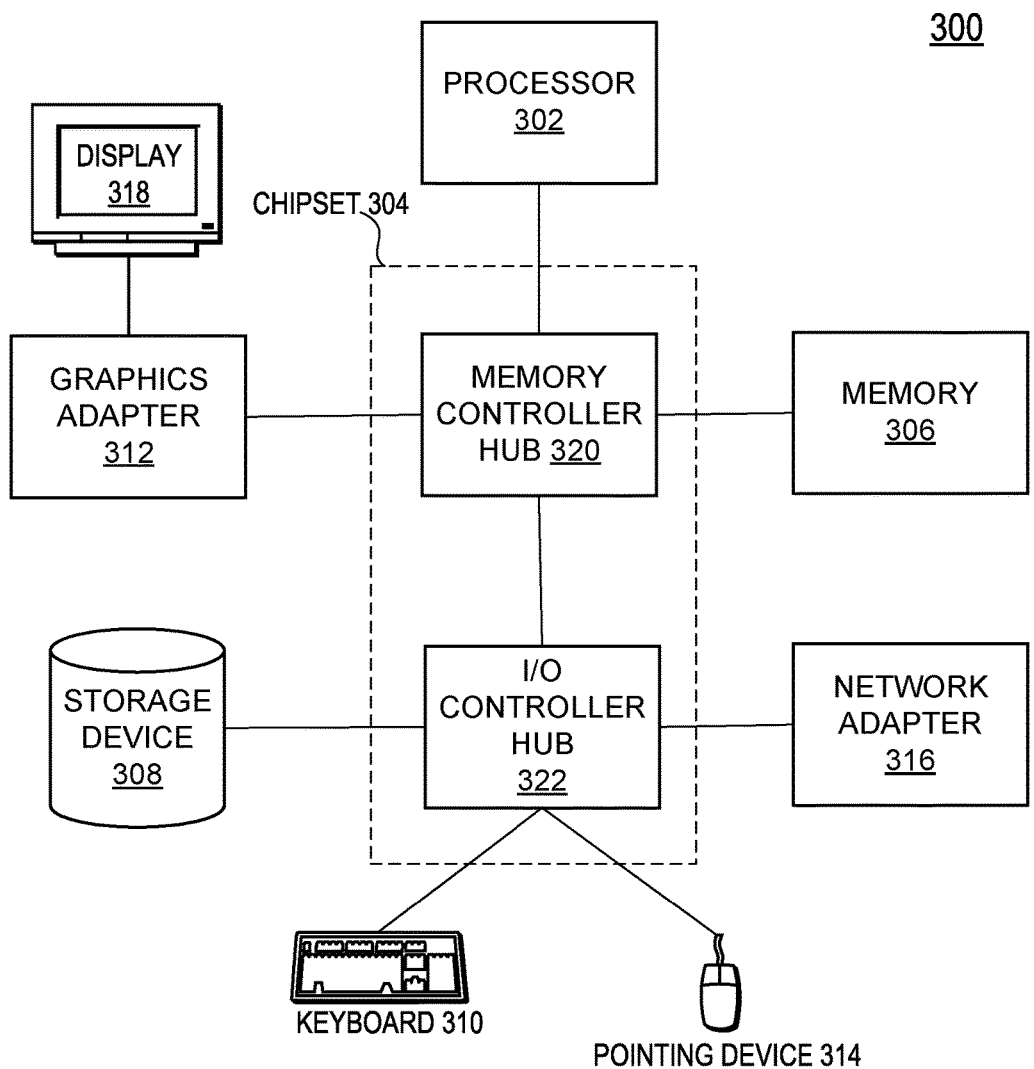
FIG. 3 is a high-level block diagram illustrating physical components of a computer used as part or all of the client device or identity provider from FIG. 1, according to one embodiment.

FIG. 3 is a high-level block diagram illustrating physical components of a computer 300 used as part or all of the client device 110 or identity provider 130 from FIG. 1, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for facilitating single sign-on to third-party applications on a client device, the method comprising:
   receiving a security policy of an organization to which a user of the client device belongs;
   receiving, by an identity provider (IDP) from a remote third-party application being used on the client device by the user, a request for identity verification of the user;
   generating, by the IDP, a token comprising a public token portion and a corresponding private token portion;
   providing, by the IDP to the remote third-party application, a client script implemented in a browser scripting language;
   requesting, by the client script, the token;
   receiving, by the client script from the IDP, the token;
   requesting, by the client script, invocation of an application of the client device to perform verification of the identity of the user, the invocation using an authenticatable link specifying a network domain and being interpreted by an operating system of the client device;
   identifying, by the operating system of the client device querying a service running at the network domain of specified by the authenticatable link, that a trusted broker application of the client device is an application registered by the network domain for use with the network domain;

verifying, by the trusted broker application, that the remote third-party application is authorized for use with single sign-on, and that the client device conforms to the security policy;

providing, by the trusted broker application to the IDP, the public token portion and an indication that the user is authorized to use single sign-on with the remote third-party application and that the client device conforms to the security policy;

associating, by the IDP, the public token portion with the user; and initiating, by the identity provider, authentication of the user by the remote third-party application, the initiating comprising sending an identifier indicating verification of an identity of the user to the remote third-party application.

2. A computer-implemented method for facilitating single sign-on to third-party applications, the method performed by a client device and comprising:

receiving a security policy of an organization to which a user of the client device belongs;

receiving a request from the user to initiate single sign-on to a third-party application;

requesting an identity provider (IDP) to verify an identity of the user; and responsive to requesting the IDP to verify the identity of the user:

receiving a client script from the IDP;

requesting, by the client script, invocation of an application of the client device to perform verification of the identity of the user, the invocation using an authenticatable link specifying a network domain and being interpreted by an operating system of the client device;

identifying, by the operating system of the client device querying a service running at the network domain of specified by the authenticatable link, that a trusted broker application of the client device is an application registered by the network domain for use with the network domain;

verifying, by the trusted broker application, that the user is authorized to use single sign-on with the third-party application, and that the client device conforms to the security policy; and providing, by the trusted broker application to the IDP, an indication that the user is authorized to use single sign-on with the third-party application and that the client device conforms to the security policy.

3. The computer-implemented method of claim 2, further comprising obtaining, by the client script from the IDP responsive to requesting the IDP to verify the identity of the user, a token comprising a public token portion and a corresponding private token portion.

4. The computer-implemented method of claim 3, further comprising providing, by the trusted broker application to the IDP along with the indication that the user is authorized, the public token portion.

5. The computer-implemented method of claim 4, further comprising:

the trusted broker application of the client device polling the IDP to determine whether the user has been verified to be authorized to use the third-party application, the polling comprising the trusted broker application providing the IDP with the private token portion.

6. The computer-implemented method of claim 2, further comprising:

responsive to receiving a notification from the IDP that the user is authorized to use the third-party application, invoking the third-party application.

7. The computer-implemented method of claim 6, wherein invoking the third-party application uses an application uniform resource locator interpreted by an operating system of the client device.

8. The computer-implemented method of claim 6, further comprising:

receiving, by the third-party application from the IDP, an initiation of an authentication flow, the initiation comprising an indication of verification that the user is authorized to use single sign-on with the third-party application.

9. A non-transitory computer-readable storage medium storing instructions that when executed by a computer processor of a client device perform actions comprising:

receiving a security policy of an organization to which a user of the client device belongs;

receiving, by an identity provider (IDP) from a remote third-party application being used on the client device by the user, a request for identity verification of the user;

generating, by the IDP, a token comprising a public token portion and a corresponding private token portion;

providing, by the IDP to the remote third-party application, a client script implemented in a browser scripting language;

requesting, by the client script, the token;

receiving, by the client script from the IDP, the token;

requesting, by the client script, invocation of an application of the client device to perform verification of the identity of the user, the invocation using an authenticatable link specifying a network domain and being interpreted by an operating system of the client device;

identifying, by the operating system of the client device querying a service running at the network domain of specified by the authenticatable link, that a trusted broker application of the client device is an application registered by the network domain for use with the network domain;

verifying, by the trusted broker application, that the remote third-party application is authorized for use with single sign-on, and that the client device conforms to the security policy;

providing, by the trusted broker application to the IDP, the public token portion and an indication that the user is authorized to use single sign-on with the remote third-party application and that the client device conforms to the security policy;

associating, by the IDP, the public token portion with the user; and initiating, by the identity provider, authentication of the user by the remote third-party application, the initiating comprising sending an identifier indicating verification of an identity of the user to the remote third-party application.

10. The non-transitory computer-readable storage medium of claim 9, the actions further comprising:

the trusted broker application of the client device polling the IDP to determine whether the user has been verified to be authorized to use the third-party application, the polling comprising the trusted broker application providing the IDP with the private token portion.

11. The non-transitory computer-readable storage medium of claim 9, the actions further comprising:
    responsive to receiving a notification from the IDP that the user is authorized to use the third-party application, invoking the third-party application.

12. The non-transitory computer-readable storage medium of claim 11, the actions further comprising:
    receiving, by the third-party application from the IDP, an initiation of an authentication flow, the initiation comprising an indication of verification that the user is authorized to use single sign-on with the third-party application.

\* \* \* \* \*